(12) United States Patent
Ohishi

(10) Patent No.: US 6,248,989 B1
(45) Date of Patent: Jun. 19, 2001

(54) TILT DETECTING DEVICE

(75) Inventor: Masahiro Ohishi, Tokyo-to (JP)

(73) Assignee: Kabushiki Kaisha Topcon, Tokyo-to (JP)

( * ) Notice: Subject to any disclaimer, the term of this patent is extended or adjusted under 35 U.S.C. 154(b) by 0 days.

(21) Appl. No.: 09/067,747

(22) Filed: Apr. 28, 1998

(30) Foreign Application Priority Data

May 9, 1997 (JP) .................................................... 9-135859

(51) Int. Cl.$^7$ .................................................... G01J 1/32
(52) U.S. Cl. ...................... 250/205; 250/577; 250/231.1; 356/249; 356/139.1; 33/366.23
(58) Field of Search .................................. 250/205, 231.1, 250/577; 33/379, 366.23, 366.12, 366.13, 366.14, 366.16; 356/139.1, 436, 148, 249, 138; 200/61.52

(56) References Cited

U.S. PATENT DOCUMENTS

| | | | |
|---|---|---|---|
| 2,252,727 | 8/1941 | Pepper | 177/351 |
| 3,569,716 * | 3/1971 | Lewis | 250/205 |
| 4,942,668 * | 7/1990 | Franklin | 33/366.14 |
| 5,015,836 * | 5/1991 | Van Antwerp | 250/205 |
| 5,111,039 * | 5/1992 | Froning | 250/231.1 |
| 5,218,771 * | 6/1993 | Redford | 33/366.12 |
| 5,953,116 * | 9/1999 | Ohtomo et al. | 356/249 |

\* cited by examiner

*Primary Examiner*—Que T. Le
*Assistant Examiner*—Thanh X. Luu
(74) *Attorney, Agent, or Firm*—Nields & Lemack

(57) ABSTRACT

The tilt detecting device of the present invention comprises a light transmission type electric bubble tube, a light source for emitting detection light to the electric bubble tube, a photodetector element for detecting emitted light amount for detecting an amount of light emitted from the light source, and a tilt detection control unit for controlling the emitted light amount of the light source to a constant level based on photodetection signal from the photodetector element for detecting emitted light amount, and causes of error are eliminated.

2 Claims, 3 Drawing Sheets

$(V3-V1)=(V6-V4)$

TILT DETECTING DEVICE

BACKGROUND OF THE INVENTION

The present invention relates to a tilt detecting device provided with an electric bubble tube, and in particular, to a tilt detecting device provided with a light transmission type electric bubble tube.

In case an equipment such a survey instrument is to be installed, which must be placed at a horizontal position, an electric bubble tube is used to detect tilting of the equipment. Description is given now on a conventional type tilt detecting device provided with the electric bubble tube, referring to FIG. 3.

An electric bubble tube 1 comprises a light source 2, a photoelectric conversion element (photodetector element) 3, a photoelectric conversion element (photodetector element) 4, and a bubble tube 5, and tilt is detected according to a signal from the electric bubble tube 1.

The light source 2 is placed under the bubble tube 5 in such a manner that the optical axis of the light source 2 runs perpendicularly to the axis of the bubble tube 5. On the other side of the bubble tube 5 opposite to the light source 2, a pair of photodetector elements 3 and 4 are arranged at symmetrical positions with respect to the optical axis of the light source 2, the two elements being separated from each other by a predetermined spacing.

The light source 2 is driven by a light source driving unit 6, and detection light 7 emitted from the light source 2 passes through the bubble tube 5 and reaches the photodetector elements 3 and 4. Each of the photodetector elements 3 and 4 outputs detected photodetection electric current corresponding to the amount of detected light to a tilt detection control unit 19. The tilt detection control unit 19 comprises a differential amplifier 8 and a control arithmetic unit 9. The differential amplifier 8 amplifies a difference of electric current values of output signals from the photodetector elements 3 and 4, performs current-voltage conversion, and outputs the result to the control arithmetic unit 9. The control arithmetic unit 9 processes the signal from the differential amplifier 8 and calculates a tilt angle.

The detection light 7 emitted from the light source 2 transmits a portion containing only liquid 10 of the bubble tube 5, but, in a portion containing an air bubble 11, it is reflected by boundary surface between the air bubble 11 and the liquid 10, and it is blocked. Therefore, amount of the detection light 7 entering the photodetector elements 3 and 4 varies according to the position of the air bubble 11. Because the position of the air bubble 11 moves according to tilting, tilt is detected by finding a difference between the amount of the light received from the photodetector element 3 and that of the photodetector element 4.

The tilt detecting device as described above is mounted in various types of survey instrument, e.g. a laser survey instrument. In the following, description will be given on general features of a laser survey instrument provided with a tilt detecting device referring to FIG. 4 and FIG. 5.

In a laser survey instrument, a laser beam having directivity is projected in a horizontal direction, and an irradiation plane is formed by rotary irradiation. A photodetection unit (not shown) is positioned on the rotary irradiation plane so as to receive and detect the laser beam and the position of irradiation plane. Thus, a reference line or a reference plane can be obtained.

In the figure, reference numeral 14 represents a laser beam emitter. The laser beam emitter 14 is supported in such a manner that it can be tilted in all directions, and a rotator 15 rotatable around the optical axis of the laser beam emitter 14 is mounted on its head. On the laser beam emitter 14, electric bubble tubes 16 and 17 as described above are mounted, and these bubble tubes run perpendicularly to two different horizontal directions. Further, a vertical tilt sensor 18 is disposed. The tilt sensor 18, the electric bubble tubes 16 and 17, and the tilt detection control unit 19 constitute together a tilt detecting device.

The rotator 15 deflects an emitted laser beam 21 toward a horizontal direction, and it is rotated by a scanning motor 22, thus projecting the laser beam 21 by rotary irradiation.

Arms 23 and 24 (the arm 24 is not shown in the figure) are extended from the laser beam emitter 14 in two different horizontal directions running perpendicularly to each other. Tip of each of the arms 23 and 24 engages with a tilt mechanism.

The tilt mechanism comprises two sets of tilt driving units 25 and 26 (the tilt driving unit 26 is not shown) mounted with respect to the arms 23 and 24 respectively, and a tilt control unit (not shown) for controlling the tilt driving units 25 and 26. Each of the tilt driving units 25 and 26 comprises a screw 27 extending in the direction of the optical axis of the laser beam emitter 14, a nut 28 screwed with the screw 27 and in contact with tip of the arms 23 or 24, and a tilt adjusting motor 32 for turning the screw 27 via gears 30 and 31. In the figure, reference numeral 29 represents a focus adjusting device, which adjusts focal point of the laser beam 21 by moving a condenser lens 33 arranged in an optical path of the laser beam emitter 14 in the direction of the optical axis.

As shown in FIG. 4, the tilt detection control unit 19 comprises the differential amplifier 8 where photodetection signals from the photodetector elements 3 and 4 are inputted, and the control arithmetic unit 9, which issues a control signal based on the signal from the differential amplifier 8. Based on the control signal from the control arithmetic unit 9, a driving circuit 34 drives the tilt adjusting motor 32, and the optical axis of the laser beam emitter 14 is adjusted to a vertical direction or to a predetermined angle.

When the laser beam 21 is projected in a horizontal direction from the rotator 15 and the rotator 15 is rotated by the scanning motor 22, an irradiation plane is formed. By setting the scanning position of the laser beam 21 to a predetermined position using a photodetection device, a reference plane can be obtained.

When the reference plane is obtained, the operating position in wide range can be easily determined. For example, this is applied in the setting of window position in interior operation of construction works or for land grading in civil engineering works.

However, the conventional type tilt detecting device as described above has the following disadvantages:

(1) Because the amount of light emitted from the light source 2 is temperature-dependent, the amount of emitted light varies when ambient temperature changes. This leads to the change of sensitivity in the angle detection and makes it difficult to perform accurate the angle detection.

(2) When external light enters, the difference of light amount entering the photodetector elements 3 and 4 at left and right is offset and is outputted from the differential amplifier 8. This makes it difficult to perform accurate the tilt angle detection.

(3) Because offset and drift of the differential amplifier 8 are outputted as error, the tilt angle detection with high accuracy cannot be achieved. To perform the detection at high accuracy, it is necessary to use an amplifier with smaller values of offset and drift in the differential amplifier 8. This means the use of expensive components and higher cost.

(4) Dark current is present in the photodetector elements 3 and 4, and this emerges in the output as offset of the differential amplifier 8. Because dark current is highly dependent on temperature, output of the detector is changed due to temperature fluctuation, and this leads to inaccurate detection of tilt angle.

(5) It is possible to increase S/N ratio by increasing the amount of the light emitted from the light source 2 and to reduce the influence of drift and offset. However, to avoid the influence of drift and offset caused by the increase of the amount of emitted light, the amount of the light emitted from the light source 2 must be increased to such an extent that the causes of error as described above become negligible, and this requires high driving current. Therefore, when the equipment is incorporated in a portable type device used in outdoor application, service life of batteries is shortened, and this also reduces life of the light source 2.

SUMMARY OF THE INVENTION

It is an object of the present invention to provide a tilt detecting device equipped with an electric bubble tube, which makes it possible to detect a tilt angle without being influenced by the causes of error such as offset and temperature drift of the differential amplifier, influence of dark current of the photodetector elements, or stray light from outside, and further, to reduce electric current to be consumed, and to extend service life of batteries and light source.

The tilt detecting device according to the present invention comprises a light transmission type electric bubble tube, a light source for emitting detection light to the electric bubble tube, a photodetector element for detecting emitted light amount for detecting an amount of light emitted from the light source, and a tilt detection control unit for controlling the amount of light from the light source to a constant level based on photodetection signals from the photodetector element for detecting light amount. The tilt detecting device according to the present invention further comprises a tilt detection control unit for detecting a tilt angle based on a difference between an output signal from the electric bubble tube when the light source is turned on and an output signal from the electric bubble tube when the light source is turned off. Also, the tilt detecting device according to the present invention comprises a pair of photodetection elements arranged on the other side of the bubble tube opposite to the light source, photodetection signals from the photodetector elements are inputted to the tilt detection control unit, sensitivity of angle detection can be stabilized by controlling the amount of light emitted from the light source to a constant level based on the photodetection signal from the photodetector element for detecting amount of emitted light, influence of stray light from outside can be eliminated by taking a difference between an output signal from the electric bubble tube when the light source is turned on and an output signal from the electric bubble tube when the light source is turned off, and the causes of error such as offset, drift, or dark current in the photodetector elements can be eliminated.

DETAILED DESCRIPTION OF THE PREFERRED EMBODIMENT

In the following, description will be given on an embodiment of the present invention referring to the attached drawings.

Figure 1:
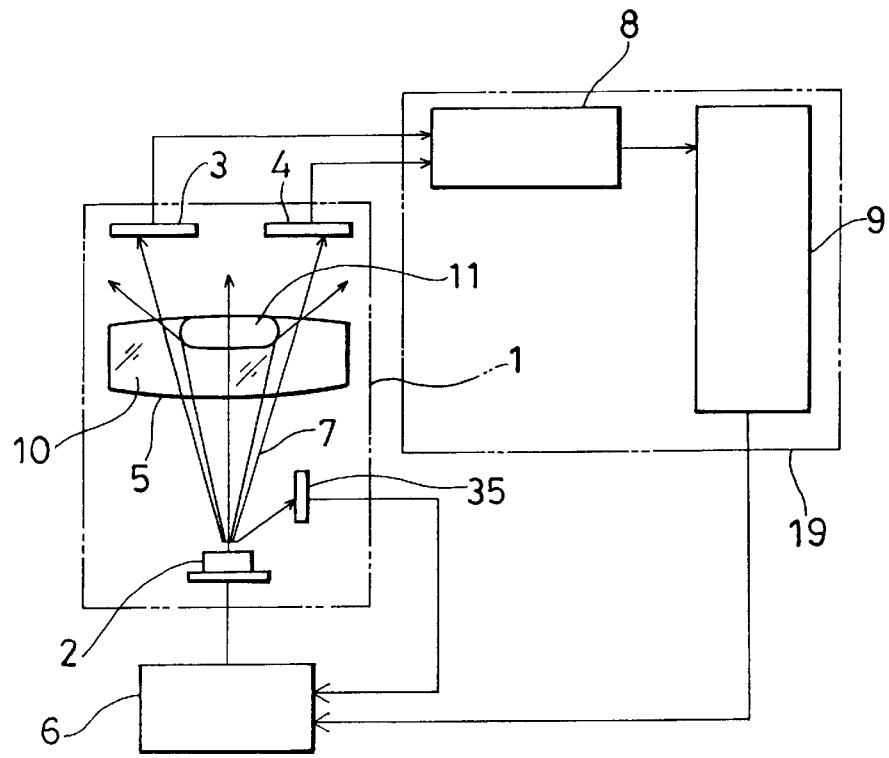
FIG. 1 is a block diagram showing an outline of an embodiment of the present invention.
Figure 3:
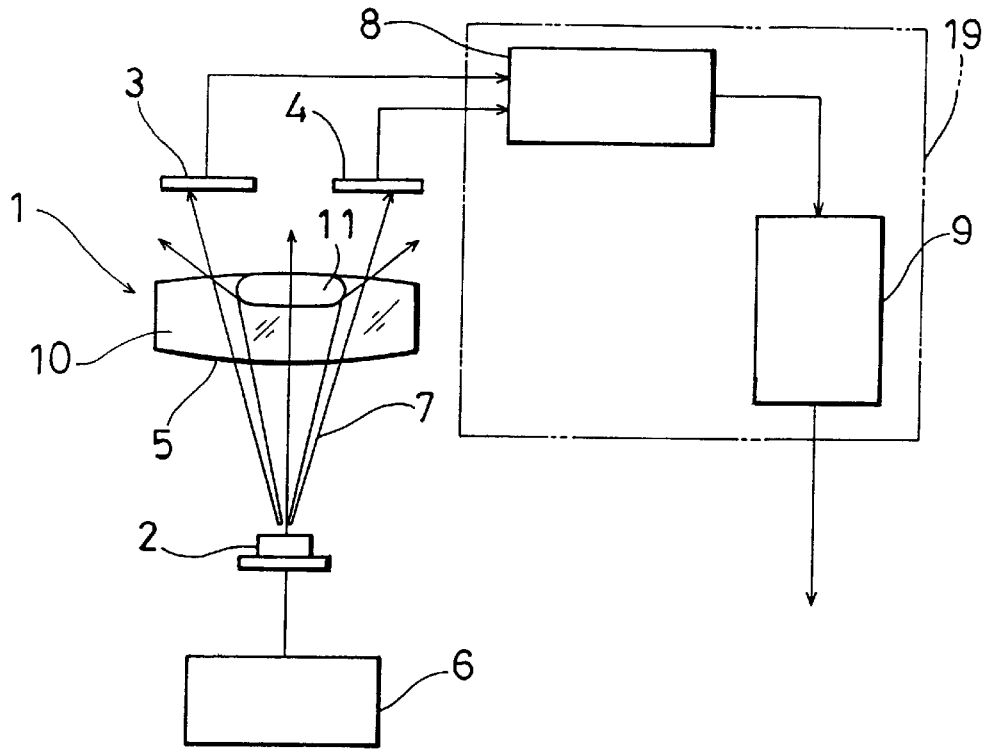
FIG. 3 is a block diagram showing an outline of a conventional type device.
Figure 4:
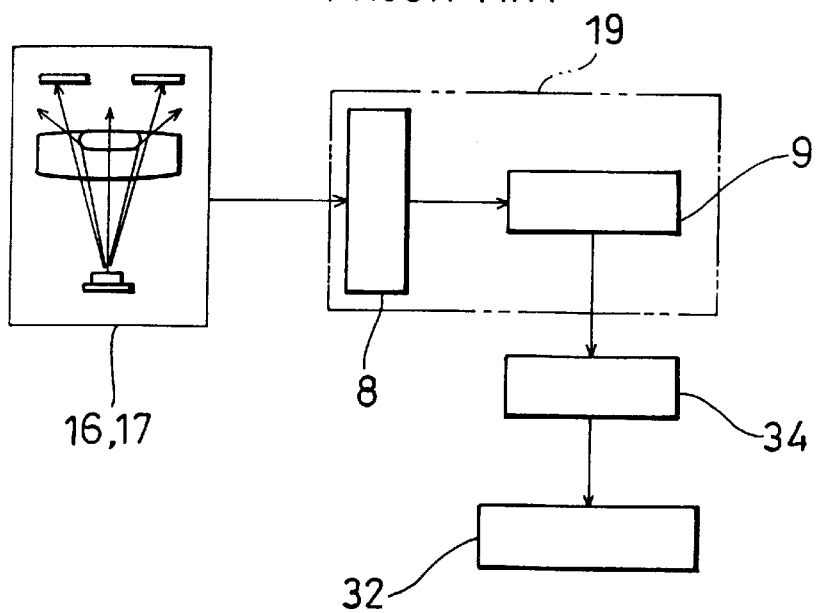
FIG. 4 is a block diagram showing an outline of a tilt detecting device arranged in a laser survey instrument.
Figure 5:
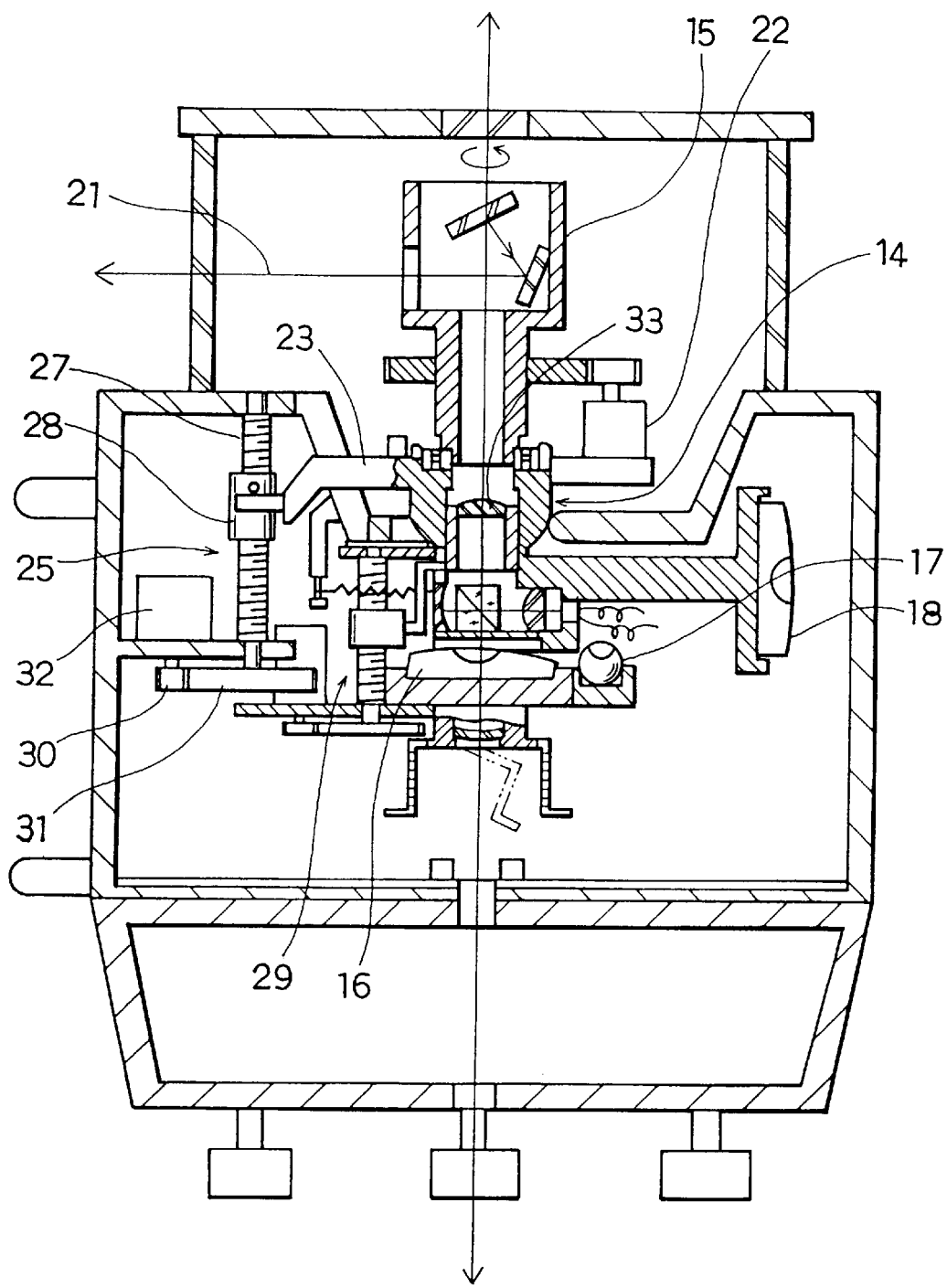
FIG. 5 is a schematical cross-sectional view of a laser survey instrument provided with a tilt detecting device.

In FIG. 1, the same component as in FIG. 3 is referred by the same symbol.

A tilt detecting device comprises an electric bubble tube 1, a light source driving unit 6, and a tilt detection control unit 19.

Further, the electric bubble tube 1 comprises a light source 2, photodetector elements 3 and 4, and a bubble tube 5. The light source 2 is arranged under the bubble tube 5, and it is arranged in such a manner that the optical axis of the light source 2 runs perpendicularly to axis of the bubble tube 5. On the other side of the bubble tube 5 opposite to the light source 2, a pair of photodetector elements 3 and 4 are arranged at symmetrical positions with respect to the optical axis of the light source 2, the two elements being separated from each other by a predetermined spacing. Near the light source 2, a photodetector element 35 for detecting emitted light amount is disposed. By the photodetector element 35 for detecting emitted light amount, a part of light amount of the detection light 7 emitted from the light source 2 is detected, and the result of photodetection is fed back to the light source driving unit 6.

The light source 2 is driven by the light source driving unit 6. Based on the feedback signal from the photodetector element 35 for detecting emitted light amount, the light source driving unit 6 controls the light source 2 in such a manner that the light amount of the detection light 7 from the light source 2 is maintained at a constant level. The detection light 7 emitted from the light source 2 passes through the bubble tube 5 and reaches the photodetection elements 3 and 4. Based on the amount of the detected light, each of the photodetector elements 3 and 4 outputs photodetection current to the tilt detection control unit 19.

The tilt detection control unit 19 comprises a differential amplifier 8 and a control arithmetic unit 9. The differential amplifier 8 amplifies a difference of output current values from the photodetector elements 3 and 4 and performs current-voltage conversion. Further, in case the values of the output current from the photodetector elements 3 and 4 are equal to each other, a reference voltage of constant level is outputted by the tilt detection control unit 19. In case there is a deviation in the values of output current values from the photodetector elements 3 and 4, positive or negative output is issued according to the current value of the photodetector elements 3 and 4. The control arithmetic unit 9 judges whether the signal from the differential amplifier 8 is positive or negative and further detects the value of the signal. Then, the tilting direction and the tilt angle are calculated, and a control signal is issued to a display unit or the like. When the electric bubble tube 1 is at a horizontal position, i.e. when the air bubble 11 is at the center, output voltage of the differential amplifier 8 becomes a reference voltage.

The detection light 7 emitted from the light source 2 passes through a portion containing only liquid 10 of the bubble tube 5. On a portion containing air bubble 11, it is reflected by boundary surface between the air bubble 11 and the liquid 10, and the light is blocked. Therefore, the light amount of the detection light 7 entering the photodetector elements 3 and 4 varies according to the position of the air bubble 11. Because the position of the air bubble 11 moves due to tilting, difference of the amount of detected light between the photodetector elements 3 and 4 represents tilting of the bubble tube 5. Thus, by detecting the difference of the amount of detected light, tilt is detected.

The control arithmetic unit 9 calculates tilt angle according to the signal from the differential amplifier 8. Its operation will be described below referring to FIG. 2.

First, at the time [t1] when the light source 2 does not emit light, the control arithmetic unit 9 reads output voltage [V1] from the differential amplifier 8. Next, at the time [t2], the light source driving unit 6 is driven, and the light source 2 is turned on. At the time [t3] when light emitting condition is stabilized, the value of output voltage [V3] of the differential amplifier 8 is read. By calculating voltage difference [V1−V3] between the output voltage [V1] and the output voltage [V3], the control arithmetic unit 9 detects the tilt angle.

In general, causes of error such as offset, temperature drift of the differential amplifier 8, dark current in the photodetector elements 3 and 4, etc. exhibit relatively slow change over time. If time interval between the time [t1] and the time [t3] is sufficiently shortened, it may be understood that the causes of error are equally added to both [V1] and [V3]. From voltage difference [V3−V1] between the voltage [V1] and the voltage [V3], a difference of photodetection amount between the photodetector elements 3 and 4 for detecting air bubble position is calculated. Position of the air bubble is detected, and the error causes as described above can be canceled. Therefore, it is possible to detect the tilt angle at high accuracy without being influenced by the error causes.

Figure 2:
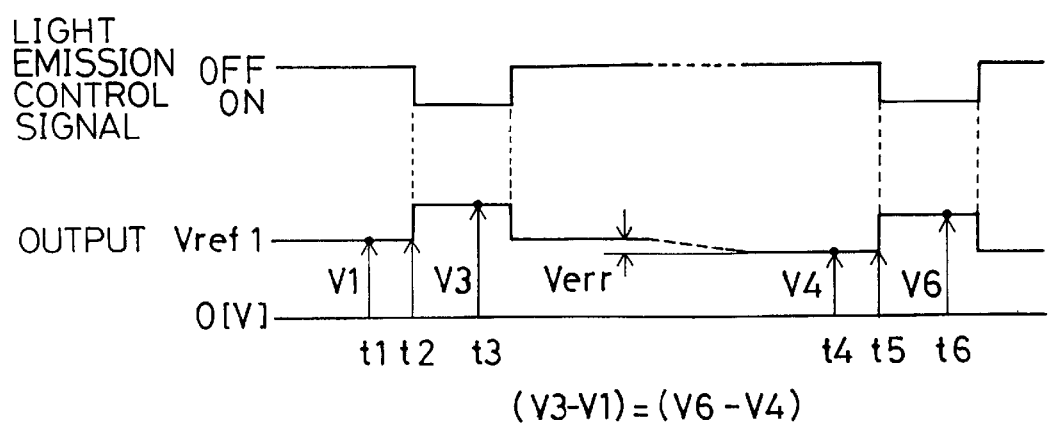
FIG. 2 is a diagram showing operation of the above embodiment.

For example, it is now supposed that, after the time [t3] in FIG. 2, the reference output voltage of the differential amplifier 8 is changed by an amount of [Verr] due to the error causes. Under such conditions, if the difference [V6−V4] between output voltage [V4] of the differential amplifier 8 and output voltage [V6] of the differential amplifier 8 when the light source 2 is not turned on at the time [t4] is given by:

$$(V3-V1)=(V6-V4)$$

when the position of the air bubble 11 in the bubble tube 5 is the same, and there is no influence of the error voltage [Verr].

As described above, it is possible according to the present invention to detect the tilt angle without being influenced by the error causes such as offset or temperature drift of the differential amplifier, dark current in the photodetector elements, stray light from outside, etc., and accuracy and stability of the detection can be improved. Further, it is possible to reduce the amount of the light emitted from the light source, and this makes it possible to decrease electric current to be consumed and to extend service life of batteries when it is incorporated in a portable type device in outdoor applications. Further, service life of the light source can be extended because driving current for the light source can be reduced.

What is claimed is:

1. A tilt detecting device, comprising a bubble tube having an upper side and a lower side, a light source arranged on one of said upper or lower sides of said bubble tube, a pair of photodetector elements arranged on a side of said bubble tube opposite to said light source for receiving a transparent light beam, each of said pair of photodetector elements generating an output signal, a photodetector element for detecting the amount of light from said light source, a light source driving unit for controlling the amount of light emitted from said light source at a constant level based on the output signals from said photodetector element for detecting the amount of light, and a tilt detection unit for controlling said light source on and off and for detecting the tilt based on the output signals from said pair of photodetector elements both when said light source is turned on and when said light source is turned off such that the amount of light is controlled at a constant level.

2. A tilt detecting device according to claim 1, wherein the voltage difference of said photodetector elements is calculated both when said light source is turned on and when said light source is turned off, and the tilt according to the photodetection amount is detected based on said voltage difference.

* * * * *